United States Patent [19]

Blondeau, Jr. et al.

[11] Patent Number: 4,928,276
[45] Date of Patent: May 22, 1990

[54] T1 LINE FORMAT FOR ROBBED SIGNALING FOR USE WITH CCITT 32K BIT PER SECOND ADPCM CLEAR CHANNEL TRANSMISSION AND 64KBPS CLEAR CHANNEL TRANSMISSION

[75] Inventors: Ernest E. Blondeau, Jr., Phoenix, Ariz.; Stephen J. Czarnecki, Carlsbad, Calif.

[73] Assignee: AG Communication Systems Corporation, Phoenix, Ariz.

[21] Appl. No.: 260,100

[22] Filed: Oct. 20, 1988

Related U.S. Application Data

[63] Continuation-in-part of Ser. No. 902,823, Sep. 2, 1986, abandoned.

[51] Int. Cl.⁵ .............................................. H04J 3/12
[52] U.S. Cl. .................................. 370/110.1; 370/99
[58] Field of Search .................... 370/110.1, 99, 111

[56] References Cited

U.S. PATENT DOCUMENTS

| | | | |
|---|---|---|---|
| 3,341,660 | 9/1967 | Duerdoth | 370/110.1 |
| 3,840,705 | 10/1974 | Haskett et al. | 370/110.1 |
| 4,125,745 | 11/1978 | Steidl | 370/110.1 |
| 4,757,499 | 7/1988 | Gorshe | 370/99 |
| 4,764,921 | 8/1988 | Graves et al. | 370/110.1 |

OTHER PUBLICATIONS

"30-Channel Pulse-Code Modulation System" (Part 3), in Post Office Electrical Engineering Journal, vol. 71, Jan. 1979, pp. 225-232.

Primary Examiner—Douglas W. Olms
Attorney, Agent, or Firm—Anthony Miologos

[57] ABSTRACT

This invention provides for uniformly distributing signaling data in a T1 line format for unrestricted 32 kb/s and 64 kb/s transmission channels. This scheme provides for placing a portion signaling information within each frame of a T1 transmission. Digital switching systems may process this signaling information more uniformly, instead of receiving 24 channels of signaling information during one T1 frame. The signaling information provides the digital switching system with indications of such supervisory functions as on-hook, off-hook and switching digits.

14 Claims, 5 Drawing Sheets

T1 LINE FORMAT FOR CCITT 32 KBPS ADPCM
AND 64 KBPS CLEAR CHANNEL TRANSMISSION
FRAME/BUNDLE ENCODE LOGIC

T1 LINE FORMAT FOR ROBBED SIGNALING FOR USE WITH CCITT 32K BIT PER SECOND ADPCM CLEAR CHANNEL TRANSMISSION AND 64KBPS CLEAR CHANNEL TRANSMISSION

This is a continuation-in-part of copending application Ser. No. 902,823, filed in Sept. 2, 1986, now abandoned.

CROSS REFERENCE TO RELATED APPLICATIONS

The present application is related to Applicant's U.S. Pat. No. 4,742,531 and U.S. Pat. No. 4,747,112 having the same inventive entity and being assigned to the same assignee as the present application. The present application also is related to co-pending U.S. applications Ser. Nos. 944,134; 944,090; and 944,102, each is assigned to the same assignee as is the present application.

BACKGROUND OF THE INVENTION

The present invention pertains to T1 transmission systems and more particularly to unrestricted 32 kb/s (32,000 bits per second) and 64 kb/s (64,000 bits per second) transmission channels which perform the robbed signaling function.

T1 transmission line facilities operate at 1.544M bits per second. The T1 line transmission facilities utilize an alternating mark inversion (AMI) signaling scheme. This AMI signal contains no more than 15 consecutive zero bit positions in a particular T1 bit stream. This requirement of not more than 15 zero bits in a string derives from the operation of repeaters in T1 transmission line systems. Commonly used repeaters may not operate within specification if more than 15 consecutive zeroes are transmitted. Repeater synchronization cannot be guaranteed for bit streams with more than 15 consecutive zeroes.

One technique used for T1 line 0 bits suppression is bipolar with 8 zeroes substitution (B8ZS). The B8ZS technique utilizes two special coding patterns containing bipolar violations which are substituted for strings of 8 zeroes in the input signal stream. Upon detecting bipolar violations with either of the two special patterns, the receiver places 8-bits of zeroes in the corresponding positions in the output bit stream.

One technical disadvantage of the B8ZS technique is that it violates the AMI signaling standard on T1 lines. Since bipolar violations normally indicate transmission errors, the deliberate introduction of these transmission errors by B8ZS signaling reduces the effectiveness of determining real errors which are detected by the AMI signaling scheme. Another disadvantage of the B8ZS technique is that it detects strings of 8 zeroes and substitutes the special violation patterns more frequently than the specified T1 line operation requires. In addition to these disadvantages, the B8ZS patterns will not propagate through standard multiplexer derived DS1 facilities or protected T1 facilities.

Severe economic disadvantages obtain for the introduction of the B8ZS technique into the North American transmission network. This introduction would require a global replacement of existing multiplexers, automatic protection switches, electronic cross-connect device (DACS), digital switch interface hardware and any other item in the network with violation monitor and removal (VMR). Such an introduction of the B8ZS technique presents an unreasonably large capital investment requirement to change network hardware.

Another more commonly used technique for meeting the T1 line zero suppression requirement is to place restrictions on the sources of bit sequences allowed in payload channels. For example, this restriction is applied at CODECS to transform a 0 bit to a 1 bit whenever an all zero 8-bit channel appears as a PCM code word. This same technique of forcing 1 bits into all zero 8-bit channels is used to further assure that no all zero 8-bit channels and therefore not more than 15 consecutive zero bits are transmitted in the T1 line format. This is a sufficient, but not a necessary condition for achieving the requirement.

The disadvantage of the technique of T1 line zero suppression by restricting sources of bit sequences is that all zero 8-bit strings are not permitted to be transmitted on any channel. This prevents the use of T1 lines for transmission of clear channel data (which require sending all possible 8-bit strings including an all zero 8-bit string) and standard CCITT 32K bit per second ADPCM. This technique also requires special treatment of all payload 8-bit strings by hardware such as CODECS and digital trunk units to force 1 bits into all zero 8-bit octets.

Robbed signaling typically occurs by using the least significant bit of each channel during every sixth frame to provide signaling functions such as, on-hook, off-hook, etc. Thus, the processing at a digital switching system for any channel may not begin until six frames of data have been received by the receiving digital switching office.

It is an object of the present invention to provide signaling data during each frame in order to facilitate uniform processing of the signaling data by the digital switching system.

SUMMARY OF THE INVENTION

This invention is a T1 line format for transmitting robbed signaling data from one digital switching system to another digital switching system via T1 line facilities in a uniform manner. This T1 line format includes a T1 data frame. The T1 data frame has a predetermined number of data channels for transmitting data between the digital switching systems.

Each T1 data frame includes a predetermined number of clear channel data channels and at least one dedicated channel for transmitting signaling data and other non-clear channel data between the digital switching systems. Clear channel data may be any combination of binary information within the 8-bit wide channel. The dedicated channel of each T1 data frame transmits the signaling data for a number of the clear channel data channels.

This T1 line format provides for transmitting a number of T1 data frames from the transmitting digital switching system to the receiving digital switching system. Each of the plurality of T1 data frames includes a portion of the signaling data. As a result, after receiving a predetermined number of the T1 data frames, the receiving digital switching system will have obtained all the signaling data in a uniform and distributed manner.

A BRIEF DESCRIPTION OF THE DRAWINGS

DESCRIPTION OF THE PREFERRED EMBODIMENT

Figure 8:
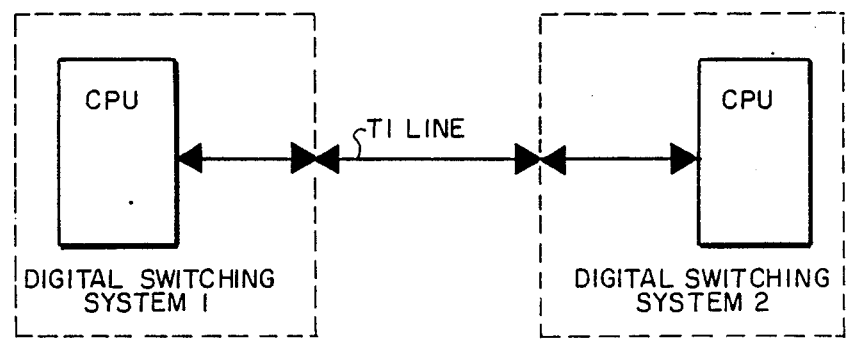
FIG. 8, is a block diagram of a system for facilitating the use of the present invention.

FIG. 8 depicts a block diagram of a system for utilizing the present invention. Digital switching system 1 is connected to digital switching system 2 via a T1 line. Each of the digital switching systems is controlled by a central processing unit (CPU) which is capable of receiving, transmitting and formatting data for communication with another switching system via the T1 line. Each of the switching systems includes the present invention.

Figure 1:
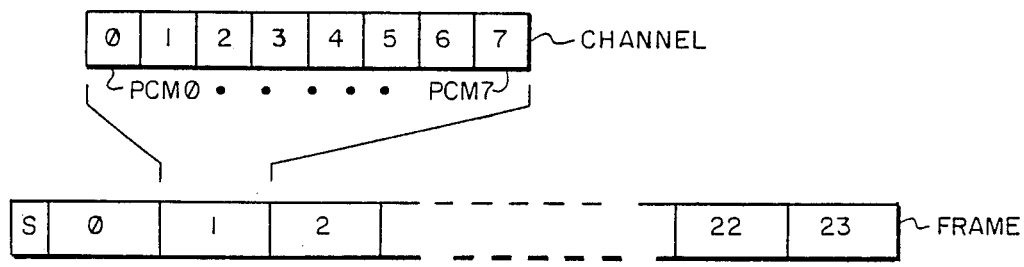
FIG. 1 is a layout diagram of typical T1 frame data format.

The structure of the T1 line format is based on the standard 1.544M bits per second DS1 digital signal format. This structure is shown in FIG. 1. The DS1 frame contains 193 bits of information. This information is organized into a single bit of synchronization or framing data plus 192 bits of payload data. The 192 bits of payload data are organized into 24 channels, each channel containing 8-bits and can be referred to as an octet.

In the DS1 signaling, the least significant bit, PCM 7, of each octet in every sixth frame is commonly used as a robbed or stolen signaling bit to indicate the signaling states of the active channels. These signaling bits are transmitted at a rate of 24 bits per 6 frames or 4 bits per frame.

Figure 2:
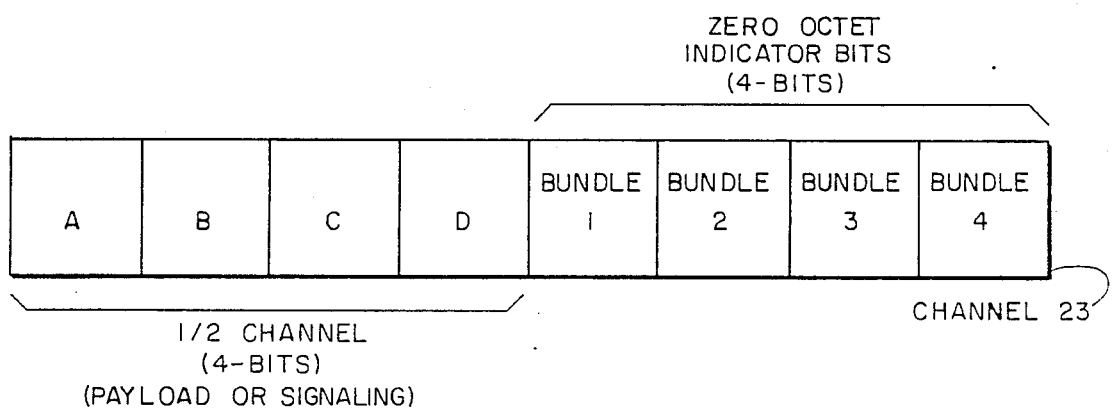
FIG. 2 is a layout diagram of channel 23 of each frame.

A new T1 line format may be constructed to replace the robbed signaling scheme. Four bits of signaling information, bits A, B, C and D shown in FIG. 2 are transmitted with each frame. The receiving end of the transmission system receives four signaling bits with each frame. Therefore, processing of the functions associated with these bits may proceed more uniformly. Furthermore, by moving signaling bits to channel 23, true clear channel transmission capability is provided. These four bits reside in the first 4 bits of channel 23. The last four bits are zero octet indicator bits. Over the span of six frames, the new format does obtain all 24 signaling bits (one bit per channel). This arrangement provides for 46 unrestricted 32 kb/s channels or 23 unrestricted 64 kb/s (clear) channels. These bits are assigned a sequence which is indexed by reference to the signaling frame. For example, bit A is channel 0 signaling information in frame 1; channel 4 signaling information in frame 5; channel 8 signaling information in frame 9, etc.

The DS1 signal contains 23 full channels of 8-bits in length (PCMO–PCM7) as shown in FIG. 1. As shown in FIG. 2, the new format of the 24th channel (channel 23) may contain a ½ payload channel (4-bits) of unrestricted information or 4 bits of signaling information (A, B, C and D) in the first four bits of channel 23. The remaining 4-bits of channel 23 are the zero octet indicator bits. For CCITT 32 kb/s ADPCM there are either 46 or 47 unrestricted channels of 4 bits in length. In order to meet the T1 line zero suppression requirements, the unrestricted payload signal is transformed to a non-zero octet wherever an all zero octet (channel) is detected within the frame.

Figure 3:
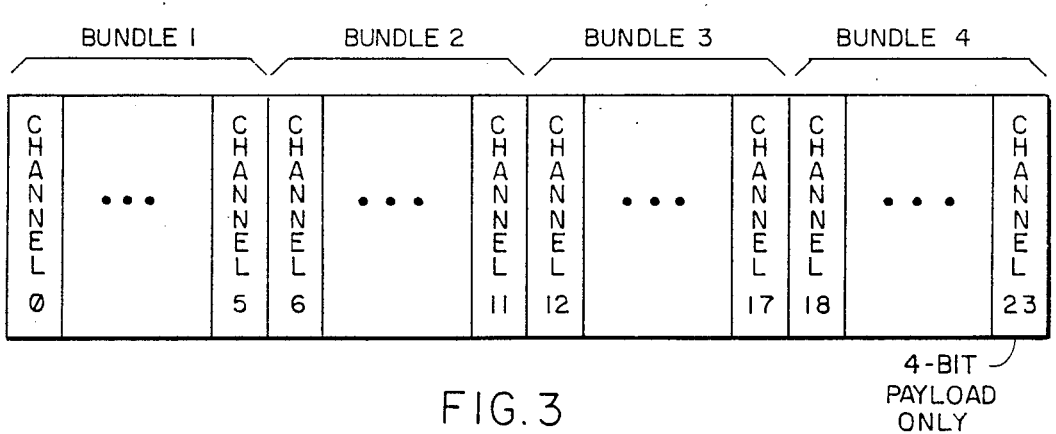
FIG. 3 is a layout diagram of the bundling arrangement of the present invention.

Referring to FIG. 3, a typical 24 channel frame of DS1 signaling is shown. The channels of the frame are shown grouped into 4 bundles, 1 through 4. Each bundle contains 6 channels of unrestricted data, except for channel 23 which has only a 4-bit payload. Bundle 1 contains channels 0 through 5; bundle 2 contains channels 6 through 11; bundle 3 contains channels 12 through 17; and bundle 4 contains channels 18 through 23. Channel 23 is only a one-half payload channel. The other 4-bits of channel 23 contain the zero octet indicator bits as shown in FIG. 2.

Each of the 4 zero octet indicator bits corresponds to an associated bundle as shown in FIG. 3. If any of the channels of a particular bundle contains an all zero octet, then the indicator bit, shown in FIG. 2, corresponding to that bundle is set to a logic 1. Otherwise, the indicator bit is always set to logic 0.

The zero octet indicator bit for bundle 4 is always set last. The bundle 4 zero octet indicator bit is handled in a special manner. First, the bundle 4 bit is set to a binary logic 0. Next, each channel in bundle 4 is examined to determine whether any octet is all zero. If any octet in bundle 4 is all zero, then the bundle 4 bit is set to logic 1.

The scheme disclosed herein may be implemented via the firmware of a digital signal processor. One such digital signal processor that may be employed is a Fujitsu digital signal processor part number MB-8764-DSP. The transmitting station will contain a digital signal processor and the necessary encode logic. The receiving station contains the digital signal processor with the decode logic.

Figure 4:
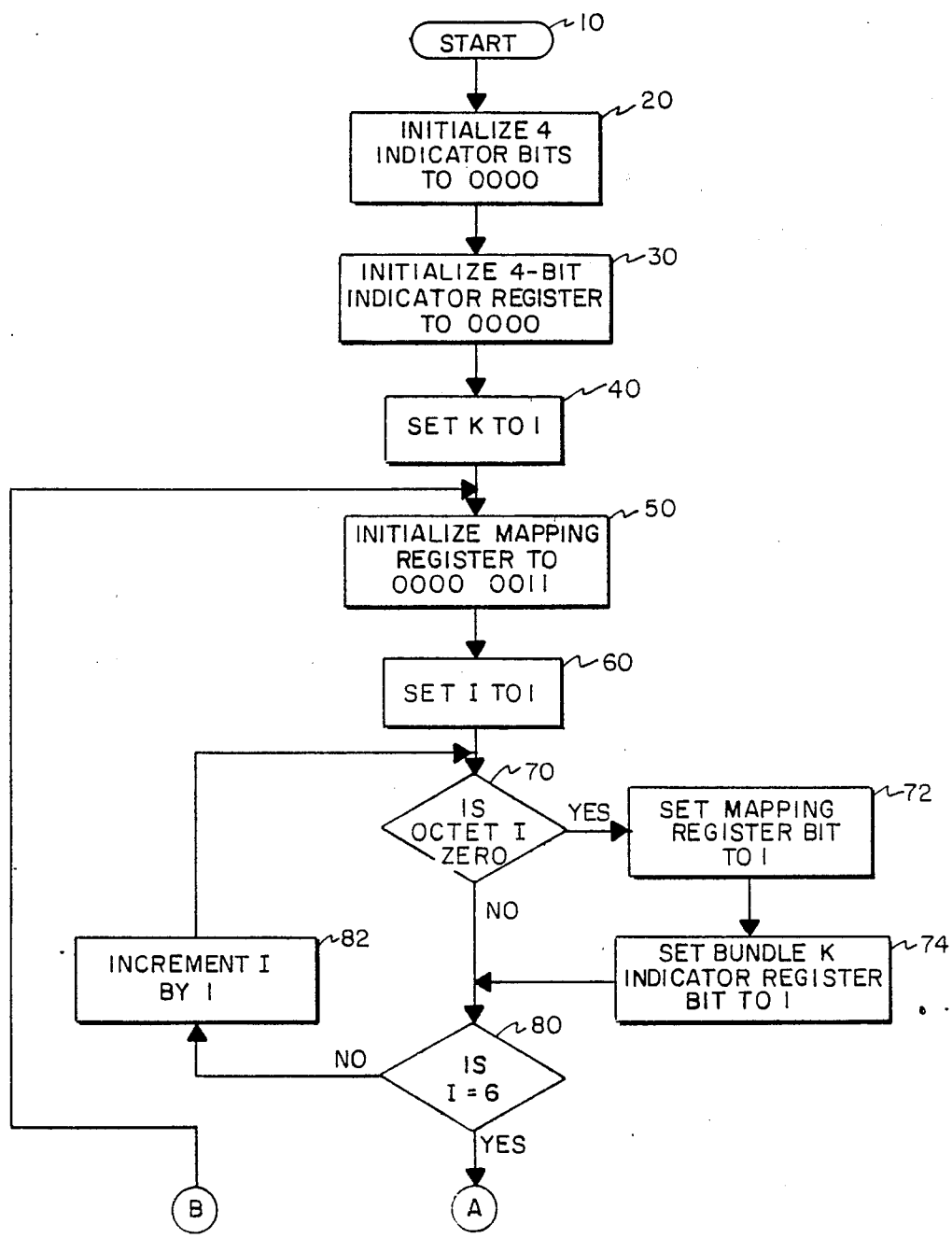
FIG. 4 is a flowchart of the bundle encode logic of the present invention.
Figure 5:
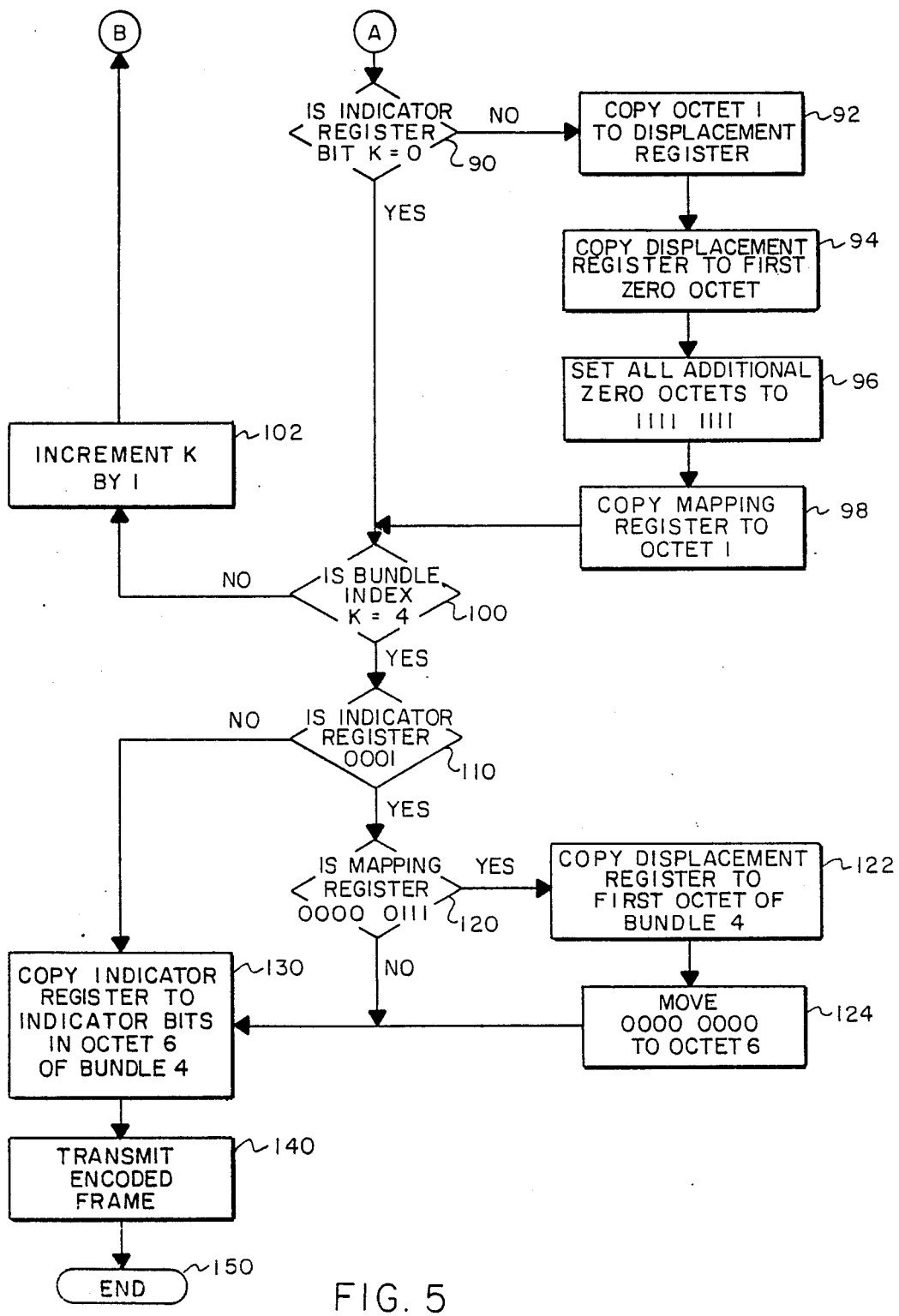
FIG. 5 is a flowchart of the bundle encode logic.

Referring to FIGS. 4 and 5, the encode logic for the T1 line format for CCITT 32 kb/s ADPCM and 64 kb/s clear channel transmission is shown. This logic begins at block 10 and first initializes the 4 indicator bits contained in the last half of channel 23 each to 0, block 20. Next, a 4-bit indicator register is initialized to 0, block 30. This register corresponds to the 4 indicator bits in channel 23 and at the end of the process, the register will be written into the 23rd channel.

An internal counter k is set equal to 1, block 40. This is the bundle counter. Next, a mapping register is initialized to the binary value 00000011, block 50. This register will locate the zero octets. Another internal counter i is said equal to 1, block 60. This is the octet counter.

Next, block 70 asks whether the i-th octet is equal to 0. If the particular octet or channel contains 8-bits of 0, the bit corresponding to that octet within the mapping register is set equal to 1, block 72. Next, the bundle indicator bit of the indicator register is set equal to 1 corresponding to the value of the internal octet counter k, block 74. The bundle indicator bits (zero octet indicator bits) are shown in FIG. 2.

Block 80 determines whether the internal octet counter i is equal to 6. If i is equal to 6, then control is passed to block 90 of FIG. 5. This indicates that all 6 octets of a particular bundle have been examined for contents of zero. If the internal i is not equal to 6, then all of the octets or channels of that particular bundle have not been examined. As a result, the internal octet counter i is incremented by 1, block 82. Then, processing control is transferred to block 70. This processing continues until all octets or channels of the particular bundle have been examined.

Block 90 determines whether the indicator register corresponding to the bundle of octets which were just examined is equal to 0. If the indicator register for this particular bundle is not equal to 0, this indicates that at least one all zero octet exists within the bundle and the first octet or channel of that bundle is temporarily saved in a displacement register, block 92. Next, the contents of the displacement register are transferred to the first zero octet, block 94. It is important to note that the first zero octet may not necessarily be octet number 1. Each additional zero octet within the particular bundle is set to binary 11111111, block 96. Since all zero octets will be recreated at the receiving end of the transmission system, the bits are altered to logic ones in order to provide additional synchronization for the repeaters and transmission equipment. As previously mentioned, the repeaters and transmission equipment require a minimum density of logic ones in order to maintain synchronization.

Next, the contents of the mapping register are copied into octet number 1, block 98. The mapping register contains a 1 in each bit position corresponding to the location of a zero octet in the bundle of 6 octets. Since only the first 6 bits of the mapping register are required for the information about the 6 octets, the other 2 bits of the mapping register may be arbitrarily set. Again, to aid the transmission equipment and repeaters, these bits are arbitrarily set to logic 1.

After the above processing has been complete for the detection of a zero octet within the bundle or if the indicator register showed that no all zero octet was found, block 90, then the bundle counter k is examined to determine whether it is equal to 4, block 100. If the bundle counter k is less than 4, it is incremented by 1 block 102, and processing is transferred to block 50 for the processing of the next bundle f octets. If the bundle counter k is equal to 4, all 4 bundles have been processed and processing control is transferred to block 110.

Block 110 tests the 4 bit indicator register to determine whether it is equal to the binary value 0001. This indicates that there is at least one all zero octet contained in the 4th bundle, if the result of the test is positive. Block 120 interrogates the mapping register to determine whether it is equal to the binary pattern 00000111. If the result of this test is also positive, this indicates that the all zero octet is the 6th octet of the bundle. Special processing must occur for this situation.

Since it is known that only the 6th octet of this bundle is all zero, the contents of the displacement register is copied back into the first octet of bundle 4, block 122. This is necessary since block 92 copied the contents of octet number 1 to the displacement register. The contents of octet 1 must be moved back to avoid losing these contents since it is known that these contents are non-zero.

Next, the binary value 00000000 is moved to the 6th octet of bundle 4, block 124. Again, it is known that this octet was zero because the mapping register had a 1 set in the bit position corresponding to this octet. The last 4-bits of this octet are a don't care function and were set to 0 arbitrarily, since the indicator register will be written into these bits in order to form the zero octet indicator bits as shown in FIG. 2. The value of the zero octet indicator bits is guaranteed to be non-zero at this time.

At the completion of the processing of block 124 or if either of the tests of blocks 110 or 120 were answered in the negative, block 130 copies the indicator register to the last 4 bits of octet number 6 of bundle number 4. If octet number 6 was zeroed by block 124, it was known that the indicator register contained a 1 in the bundle 4 position. Therefore, this indicator register is written over the last 4 bits of octet number 6 of bundle 4. As a result, this octet will be guaranteed to have at least one logic 1.

The zero octet processing for this frame has been complete. The frame is then transmitted to the conversion logic which places the frame in the AMI format, block 140. The processing for this frame is then ended, block 150.

Figure 6:
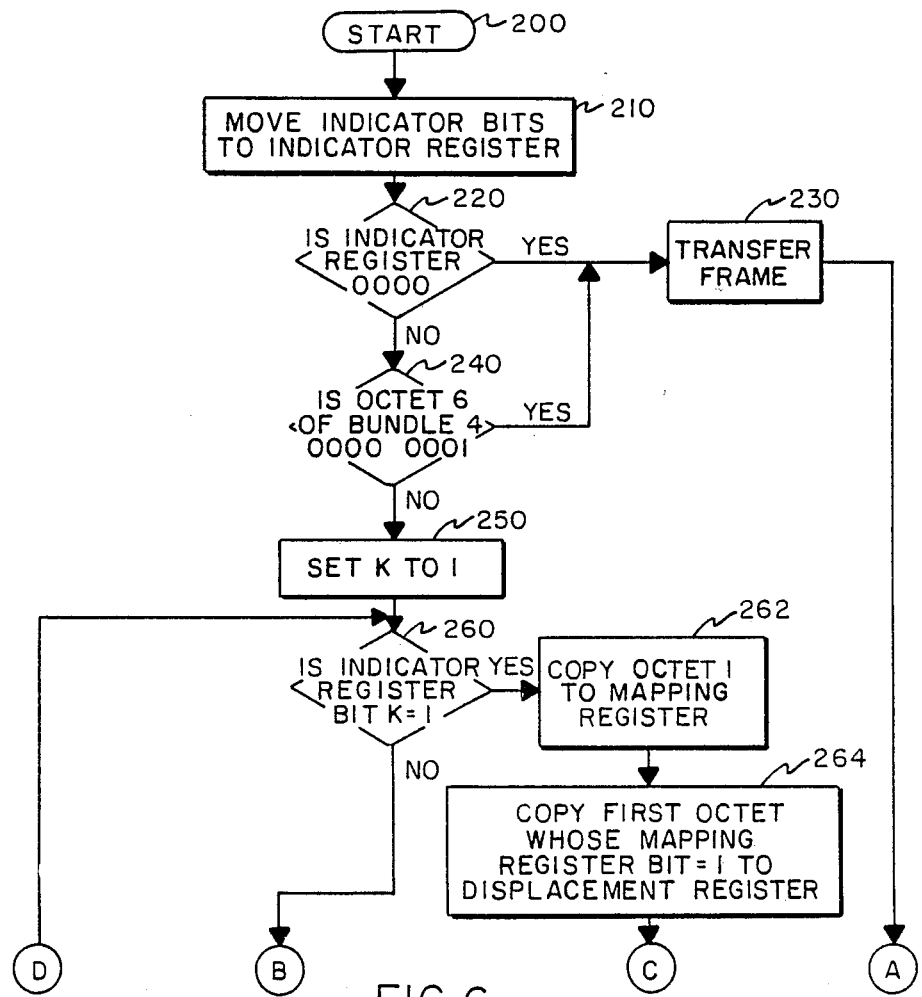
FIG. 6 is a flowchart of the bundle decode logic of the present invention.
Figure 7:
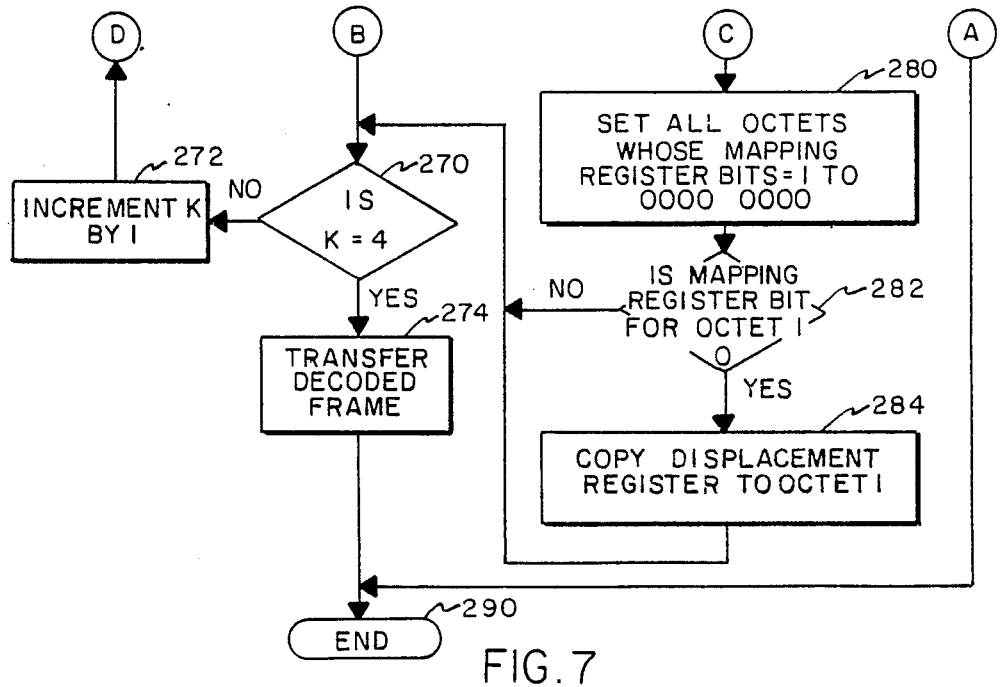
FIG. 7 is a flowchart of the bundle decode logic.

Referring to FIGS. 6 and 7, the frame/bundle decode logic is shown. The decode logic process is initiated at block 200. Block 210 moves the indicator bits from bits 5 through 8 of channel 6 of bundle 4 to an indicator register. Next, the indicator register is examined to determine whether all 4 of the zero octet indicator bits are equal to zero. If all four zero octet indicator bits are zero, no channel within the particular frame contains an all zero octet. As a result, the frame is transferred for further processing exactly as it was received. No bit modification is required. Therefore, processing control is transferred to block 290, which ends the frame/bundle decode logic for this particular frame.

If the zero octet indicator bits contained in the indicator register are not all zero, processing control is passed to block 240. Block 240 interrogates the 23rd channel or octet 6 of bundle 4 to determine whether the value of this channel is equal to the binary value 00000001. For a positive result of the test of block 240, it is known that only channel 6 of bundle 4 was a zero octet in the particular frame. The bundle 4 zero octet indicator bit had previously been set to logic 1. Since this particular logic 1 in the bundle 4 zero octet indicator bit position is not a payload signal, no modification of the frame need occur. As a result, control is transferred to block 230 which transmits the frame exactly as received for further processing. This processing handles the special case of channel 23 being the only octet with an all zero value. Then, the decode logic processing is ended, block 290.

If the test of block 240 was answered in the negative, block 250 sets an internal bundle counter k equal to 1. Next, the indicator register is examined to determine whether the k-th zero octet indicator bit is equal to 1. It should be remembered that if a particular zero octet indicator bit is equal to 1 there is at least 1 all zero channel or octet in that particular bundle. If this particular zero octet indicator bit is equal to 1, then block 262 copies the first octet of that bundle to the mapping register. For bundles in which there is at least one zero octet the first channel or octet contains the mapping for the locations of these octets. Next, the first octet whose mapping register bit is equal to 1 is copied to the displacement register, block 264. Then each octet of the bundle whose mapping register bit is equal to a 1 will have the binary value 00000000 written into that octet, block 280. Next, block 282 determines whether the mapping register bit for the first octet is zero. If the mapping register bit for the first octet is zero, then the displacement register is copied back into the first octet, block 284. This indicates that the first octet of the bundle was non-zero and must be replaced with its original value which was displaced to another location so that the mapping bits could be placed in the first octet of each bundle.

After the displacement register has been copied by block 284 or if the question of block 282 is answered in a negative or if the question of block 260 is answered in the negative, then processing control is given to block 270. Block 270 determines whether the value of the internal bundle counter k is equal to 4. If this test is answered in the negative, the bundle counter k is incremented by 1, block 272. Then, processing control is begun again at block 260. If k is less than 4, processing for all 4 bundles comprising the particular frame is not yet complete. If the bundle counter is k is equal to 4, then all octets which were originally zero before the transmission have been reconstructed to be zero. Lastly, block 274 transfers the decoded frame for further processing and the decoding process is ended, block 290.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a data transmission system having first and a second digital switching systems connected via T1 line transmission facilities, a means for generating a T1 line format for transmitting robbed signaling data from said first digital switching system via said T1 line transmission facilities, said means for generating a T1 line format comprising:
   a T1 data frame, said T1 data frame including a predetermined number of data channels for transmitting data between said first and second digital switching systems;
   each T1 data frame further including:
      a predetermined number of clear data channels;
      at least one channel for transmitting signaling data and non-clear channel data between said first and second digital switching systems said non-clear channel data providing information indicating whether a corresponding data channel contains an absence of data;
      said channel being operated to transmit said signaling data and said non-clear channel data for a plurality of said clear data channels; and,
   said means for generating a T1 line format further comprising:
   a plurality of said T1 data frames, each including said plurality of signaling data and said non-clear channel data, and said plurality of said T1 data frames being operated to provide said signaling data and said non-clear channel data to said second digital switching system by providing a uniform portion of said signaling data and said non-clear channel data during each of said T1 data frames.

2. A means for generating A T1 line format as claimed in claim 1, said predetermined number of data channels of said T1 data frame is equal to twenty-four (24).

3. A means for generating a T1 line format as claimed in claim 2, said predetermined number of clear data channels of said T1 data frame means is equal to twenty-three (23).

4. A means for generating a T1 line format as claimed in claim 3, wherein each of said data channels is eight (8) bits in width.

5. A means for generating a T1 line format as claimed in claim 4, wherein said channel for transmitting signaling data and non-clear channel data of each T1 data frame includes at least one signaling data bit.

6. A means for generating a T1 line format as claimed in claim 4, wherein said channel for transmitting signaling data and non-clear channel data of each T1 data frame includes a plurality of signaling data bits.

7. A means for generating a T1 line format as claimed in claim 6, wherein said plurality of signaling data bits of each said portion includes four (4) signaling data bits.

8. A means for generating a T1 line format as claimed in claim 1, wherein six (6) of said T1 data frames are operated to provide said signaling data for up to twenty-four (24) of said data channels.

9. A means for generating a T1 line format as claimed in claim 7, said signaling data of each said T1 data frames is located in the four (4) most significant bits of the twenty-four (24th) data channel.

10. A means for generating a T1 line format as claimed in claim 9, said non-clear channel data of each said T1 data frames is located in the four (4) least significant bits of the twenty-fourth (24th) data channel.

11. A means for generating a T1 line format as claimed in claim 10, said signaling data of a first T1 data frame includes one signaling data bit for each of a first four (4) of said data channels.

12. A means for generating a T1 line format as claimed in claim 11, said signaling data of each succeeding T1 data frame of said plurality of T1 data frames includes one signaling bit corresponding to each of a next four (4) of said data channels.

13. A means for generating a T1 line format as claimed in claim 10, said non-clear channel data of a first T1 data frame includes one non-clear channel bit for each of a first six (6) of said data channels.

14. A means for generating a T1 line format as claimed inn claim 13, said non-clear channel data of each succeeding T1 data frame of said plurality of T1 data frames includes one non-clear channel bit corresponding to each of a next six (6) of said data channels.

* * * * *